United States Patent
Amaanan et al.

(10) Patent No.: US 11,958,349 B2
(45) Date of Patent: Apr. 16, 2024

(54) BATTERY ARRANGEMENT HAVING COMPRESSED FOAM PLATE

(71) Applicants: RENAULT s.a.s., Boulogne-Billancourt (FR); NISSAN MOTOR CO., LTD., Yokohama (JP)

(72) Inventors: Sofiane Amaanan, Montigny le Bretonneux (FR); Charles Zhang, Guyancourt (FR)

(73) Assignees: RENAULT s.a.s., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 314 days.

(21) Appl. No.: 17/417,438

(22) PCT Filed: Dec. 13, 2019

(86) PCT No.: PCT/EP2019/085041
§ 371 (c)(1),
(2) Date: Jun. 23, 2021

(87) PCT Pub. No.: WO2020/136021
PCT Pub. Date: Jul. 2, 2020

(65) Prior Publication Data
US 2022/0118839 A1     Apr. 21, 2022

(30) Foreign Application Priority Data
Dec. 26, 2018    (FR) .................................... 1874186

(51) Int. Cl.
*B60K 1/04*      (2019.01)
*B60L 50/60*    (2019.01)
(Continued)

(52) U.S. Cl.
CPC ................ *B60K 1/04* (2013.01); *B60L 50/64* (2019.02); *B60L 50/66* (2019.02);
(Continued)

(58) Field of Classification Search
CPC ... B60K 1/04; B60K 2001/0438; B60L 50/64; B60L 50/66; H01M 50/244; H01M 50/249; H01M 2220/20
See application file for complete search history.

(56) References Cited

U.S. PATENT DOCUMENTS

2013/0153317 A1*   6/2013   Rawlinson .............. F41H 7/042
                                                                                  180/68.5
2013/0171487 A1    7/2013   Bull et al.
(Continued)

FOREIGN PATENT DOCUMENTS

| DE | 10 2015 111 749 A1 | 1/2017 |
| EP | 2 610 943 A1 | 7/2013 |
| WO | WO 2018/015269 A1 | 1/2018 |

OTHER PUBLICATIONS

International Search Report dated Mar. 31, 2020 in PCT/EP2019/085041 filed on Dec. 13, 2019, 2 pages.

*Primary Examiner* — Jason D Shanske
*Assistant Examiner* — James J Triggs
(74) *Attorney, Agent, or Firm* — Oblon, McClelland, Maier & Neustadt, L.L.P.

(57) ABSTRACT

A structure of an electric or hybrid vehicle includes a floor, a battery container secured beneath the floor, and a compressed foam plate arranged between the battery container and the floor.

16 Claims, 4 Drawing Sheets

Figure 1:
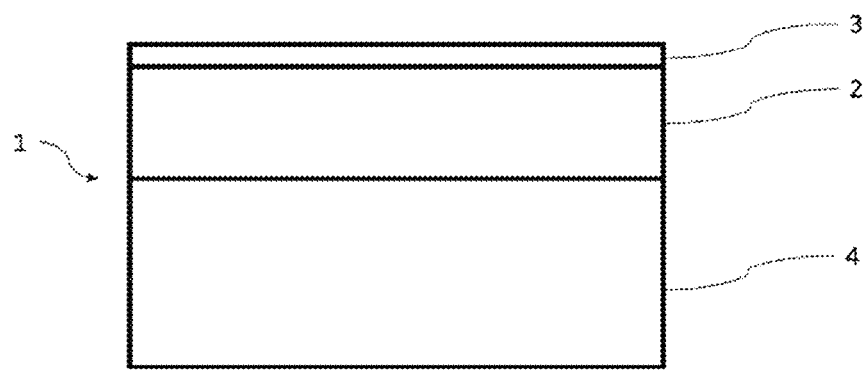

(51) Int. Cl.
*B60L 50/64* (2019.01)
*H01M 50/244* (2021.01)
*H01M 50/249* (2021.01)

(52) U.S. Cl.
CPC ....... *H01M 50/244* (2021.01); *H01M 50/249* (2021.01); *B60K 2001/0438* (2013.01); *H01M 2220/20* (2013.01)

(56) References Cited

U.S. PATENT DOCUMENTS

| | | |
|---|---|---|
| 2016/0254507 A1 | 9/2016 | Bull et al. |
| 2017/0025655 A1 | 1/2017 | Klimek et al. |
| 2019/0009737 A1* | 1/2019 | Guigner .............. B60R 13/0838 |
| 2019/0144048 A1* | 5/2019 | Frenzel .................. B62D 25/20 296/1.03 |

\* cited by examiner

BATTERY ARRANGEMENT HAVING COMPRESSED FOAM PLATE

The invention relates to a structure of a motor vehicle. The invention also relates to a vehicle comprising such a structure, and to a method for assembling such a structure.

Vehicles, and in particular motor vehicles, experience vibrations. In order to improve the comfort of these vehicles, it is necessary to reduce these vibrations which in particular give rise to noise.

Document US2008/136110A1 is known which describes a system for sound insulation between the floor of the vehicle and the energy reservoir, whether this is a fuel tank or a battery tray. The space between the fuel tank and the floor is insulated by means of an acoustic seal so as to prevent the noise being transmitted into the sealed empty space.

However, this solution provides partial insulation with respect to noise but does not provide insulation with respect to vibrations.

The aim of the invention is to provide a vehicle structure which remedies the above drawbacks. In particular, the invention serves to provide a vehicle structure which is simple and easy to implement and with which the floor of a vehicle can be insulated with respect to noise and vibrations.

The invention relates to a structure for an electric or hybrid vehicle comprising a floor, a battery tray secured beneath the floor, and a compressed foam plate arranged between the battery tray and the floor.

In one embodiment, the surface of the foam plate comprises microscopic perforations configured for evacuating air contained in the foam when the plate is compressed and/or configured to avoid ingress of water into the foam.

In one embodiment, the foam plate further comprises a hole that opens on one of its faces or that passes through it from one face to the other, this hole being configured for evacuating air contained in the foam when the plate is compressed.

In one embodiment, the foam plate further comprises a portion positioned toward the rear of the vehicle, of which the surface comprises holes configured for evacuating air contained in the foam when the plate is compressed.

In one embodiment, the foam plate is compressed between the floor and the battery tray with a degree of compression of between 20° and 40° inclusive, in particular between 30% and 40% inclusive.

In one embodiment, the thickness of the foam plate when compressed is between 10 mm and 20 mm inclusive, preferably between 13 mm and 14 mm inclusive, in particular equal or essentially equal to 13 mm, with a degree of compression of 30% of the plate.

In one embodiment, the foam plate comprises a polyurethane foam.

In one embodiment, the foam is a foam having cells of dimensions smaller than 2 mm.

The invention also relates to a vehicle, in particular a hybrid vehicle or electric motor vehicle, comprising a structure according to the invention.

Finally, the invention relates to a method for assembling a vehicle structure comprising a step of perforating a foam plate, a step of arranging the foam plate between a vehicle floor and a vehicle battery tray, a step of compressing said foam plate to a degree of compression of between 20% and 40%, and a step of securing the battery tray to the floor in such a way that the foam plate remains compressed to a degree of compression of between 20% and 40%.

The appended drawings show, by way of example, an embodiment of a vehicle structure according to the invention.

Figure 2:
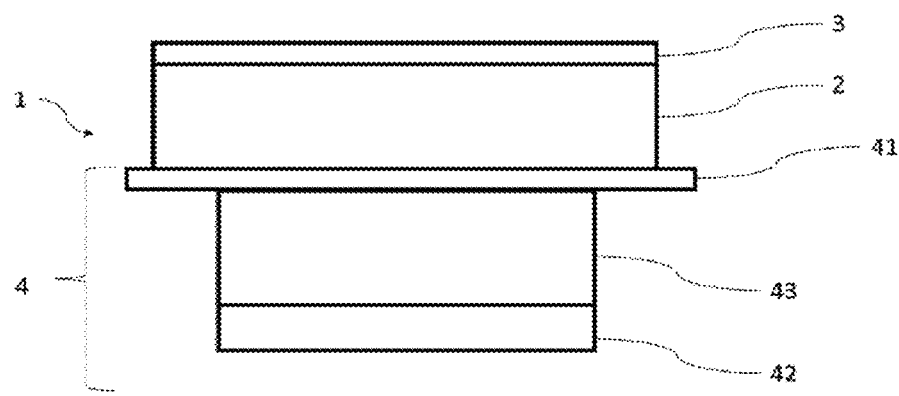
Figure 3A:
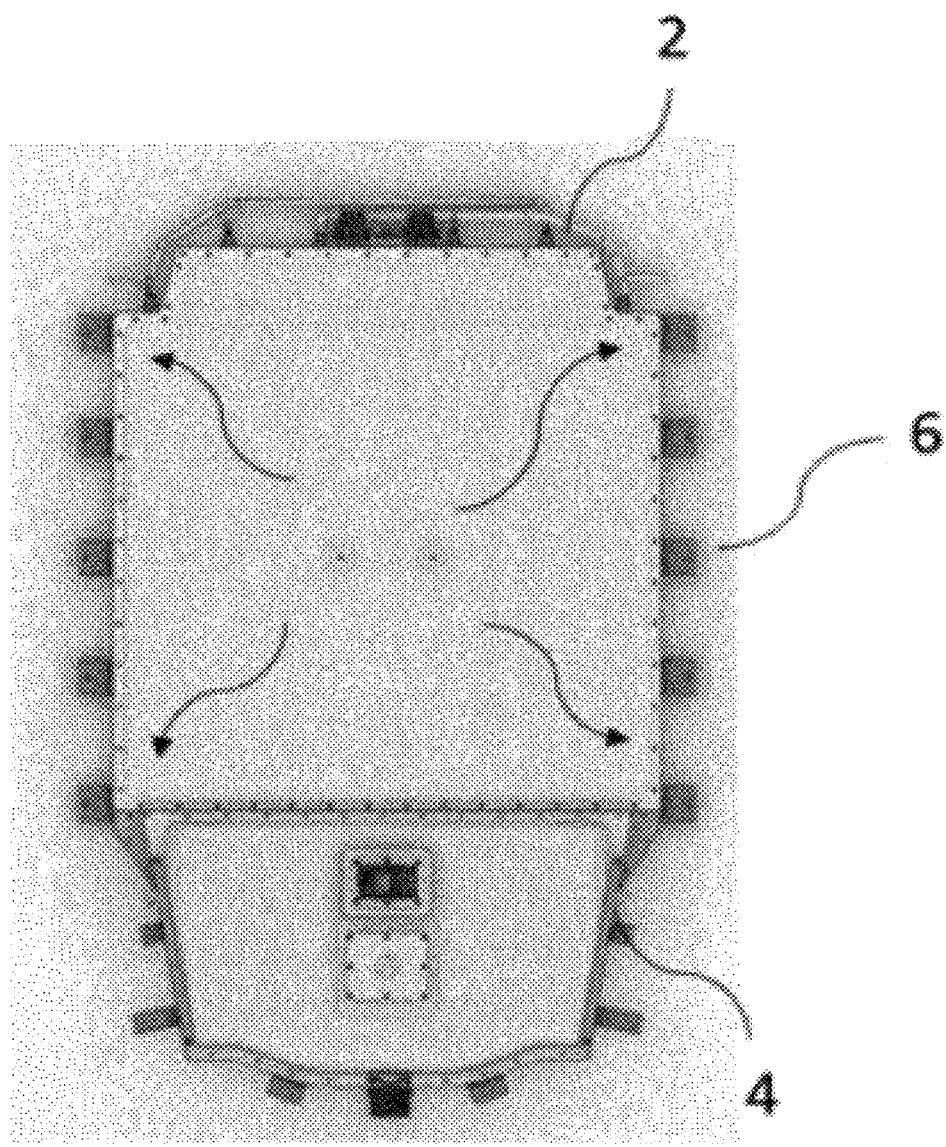
Figure 3B:
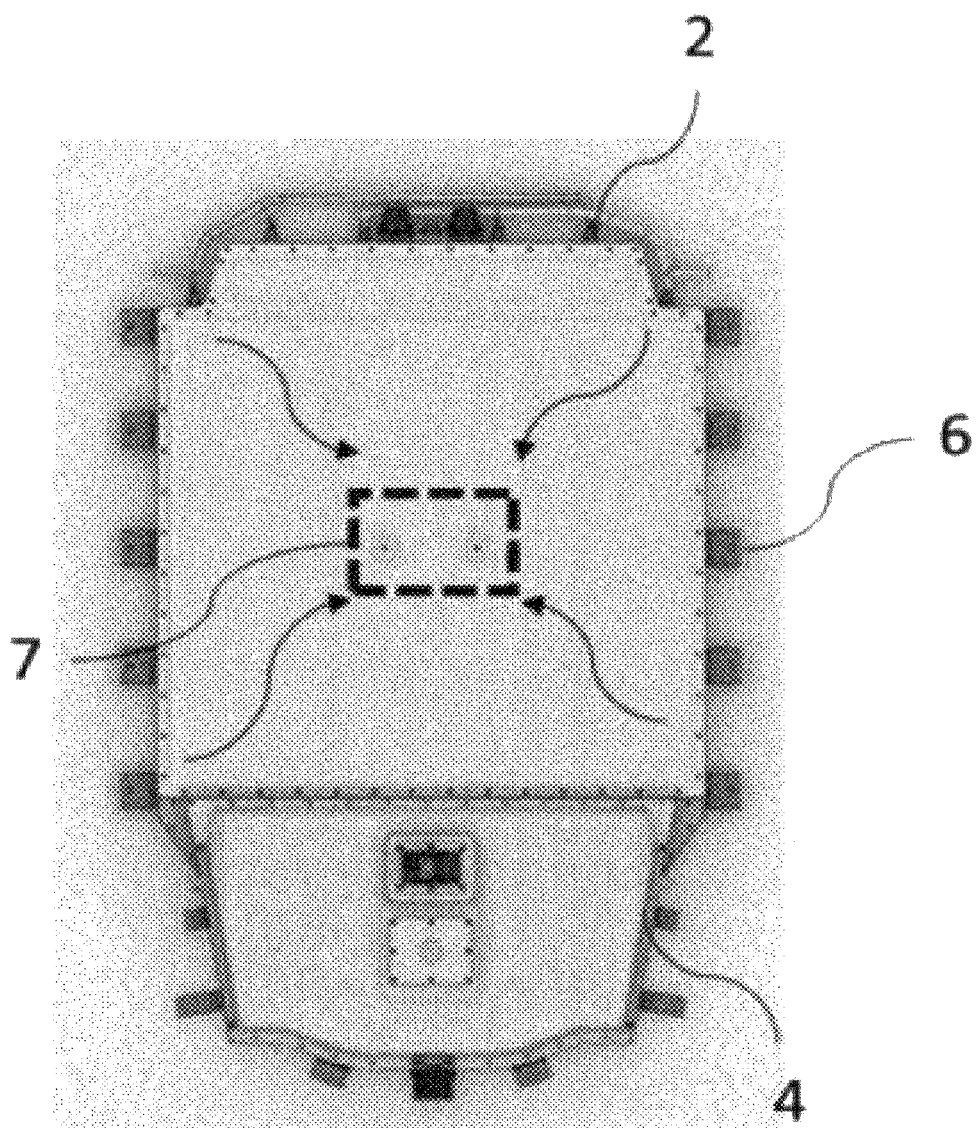
Figure 3C:
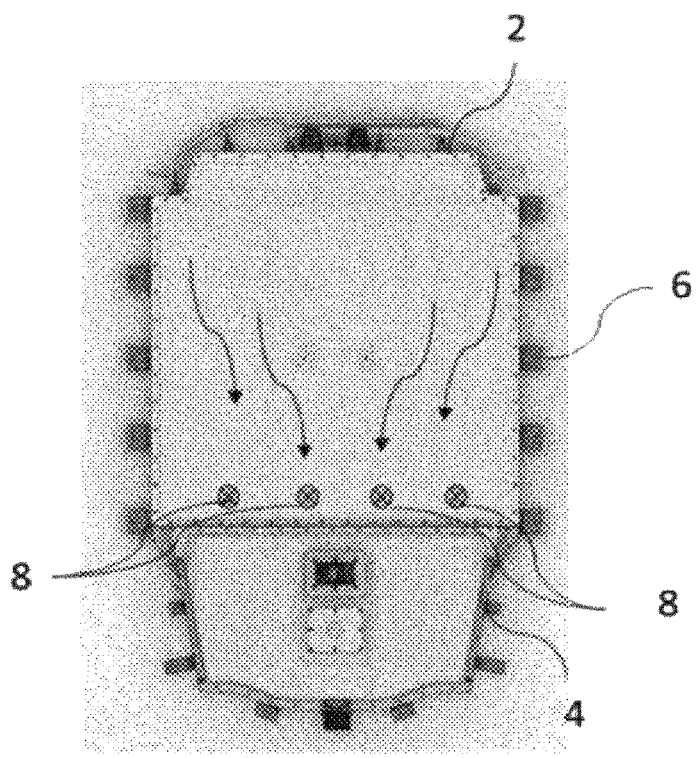
Figure 4:
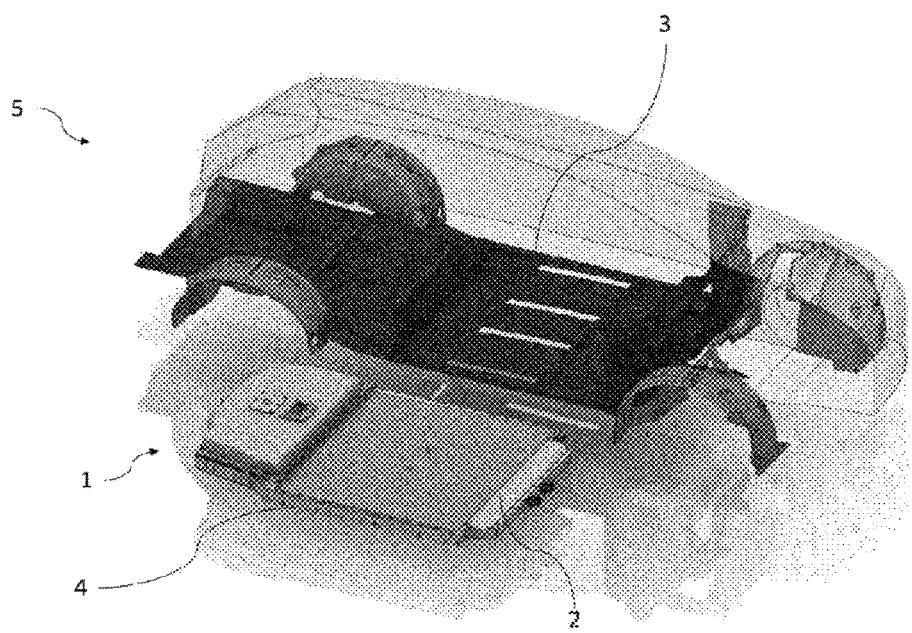

FIG. 1 shows a vehicle structure.
FIG. 2 shows a vehicle structure.
FIG. 3A shows a foam plate seen from above according to a first embodiment that optimizes evacuation of the air.
FIG. 3B shows a foam plate seen from above according to a second embodiment that optimizes evacuation of the air.
FIG. 3C shows a foam plate seen from above according to a third embodiment that optimizes evacuation of the air.
FIG. 4 is an exploded view of a vehicle structure according to one embodiment of the invention.

An example of a vehicle structure according to one embodiment of the invention is described hereinbelow with reference to FIG. 1.

The structure 1 comprises a vehicle floor 3, and a battery tray 4. The battery tray 4 is secured to the floor 3. In particular, the battery tray is secured beneath the floor 3. The expression "beneath" is to be understood here as meaning that the battery tray 4 is beneath the floor 3 when the vehicle comprising the structure is in a position of operation. The battery tray 4 is therefore preferably intended to be arranged outside the passenger compartment of the vehicle.

The vehicle structure 1 also comprises a foam plate 2. The foam plate 2 is arranged between the battery tray 4 and the floor 3 of the vehicle structure 1.

The floor 3 advantageously constitutes a horizontal platform of the passenger compartment of the vehicle.

The floor 3 is not restricted to the first layer inside the passenger compartment of the vehicle, but may comprise multiple layers or an assembly of which at least one layer is arranged at the internal surface of the vehicle.

The battery tray 4 may comprise at least one portion that is parallelepipedal or essentially parallelepipedal in shape.

As shown in FIG. 2, the battery tray 4 comprises a battery 43. The battery 43 is preferably electrically connected to an electric drive motor of the vehicle. In one embodiment, the battery tray 4 comprises a cooling system 42. The cooling system 42 is preferably arranged beneath the battery 43.

The battery tray 4 also comprises a compartment or an envelope that is intended to contain the battery and the cooling system. An upper side 41 of the compartment is in contact with the foam plate 2 or is oriented toward the foam plate 2.

The width and the length of the foam plate 2 are significantly greater than the thickness of said foam plate 2. Thus, the foam plate 2 preferably comprises two main faces separated by a smaller dimension, called the thickness.

The expression "significantly greater" is to be understood as meaning that the width and the length are at least 10 times greater than the thickness, preferably at least 50 times.

The foam plate 2 is a solid foam plate 2. The foam plate 2 comprises an open-cell or closed-cell material. The open-cell material comprises a fine-geometry solid matrix that is saturated with a fluid. The open-cell material preferably comprises a continuous solid network in which air bubbles are trapped.

Preferably, the foam plate 2 comprises a polymer foam.

The polymer foam advantageously makes it possible to obtain a foam plate 2.

Preferably, the foam plate 2 comprises a polymer matrix, most preferably a polyurethane matrix.

The foam plate 2 may comprise fire-retardant compounds. Thus, the foam plate 2 may also serve as a firewall between the battery tray 4 and the floor 3 of the structure 1 of the vehicle.

The open-cell or closed-cell material may be defined by its density and by the structure of the matrix, in particular by its porosity and by the shape of its cells.

The loss factor (or internal damping modulus) of the open-cell material may be between 0.1 and 0.3 at a frequency of 10 Hz and at a temperature of 23° C. The loss factor is a measure of the ratio of the energy dissipated by damping to the elastic energy that is conserved and then restored during a deformation cycle.

The loss factor is equal to the tangent of the ratio between the loss modulus over the storage modulus (E').

The storage modulus in compression (E') of the open-cell material may be between 1000 and 50 000 Pa at a frequency of 10 Hz and at a temperature of 23° C.

The density of the open-cell material may be between 20 and 100 g/L.

Preferably, the foam plate 2 comprises a micro-cellular material, that is to say that the size of the cells of the network is between 1 μm and 1 mm.

In one embodiment, the foam is a closed-cell foam and the cells have dimensions smaller than 2 mm.

The foam plate 2 arranged between the floor 3 and the battery tray 4 is compressed or preloaded. Indeed, compressing the foam plate 2 advantageously permits better absorption of the vibrations of the floor 3 and of noise. The compression increases the rigidity of the plate.

In one embodiment, the foam plate 2 is compressed by forces orthogonal to the two main faces or is compressed so as to reduce the thickness of the foam plate 2.

The battery tray 4 may be mechanically secured to the floor 3 so as to leave a space (between the battery tray and the floor 3) that is smaller than the thickness of the foam plate 2 at rest, that is to say in the absence of any load acting on the plate. Thus, the foam plate 2 is deformed during installation by the compression provided by the floor 3 and the upper side 41 of the battery tray 4.

The vehicle structure may comprise securing means so as to be able to secure the battery tray 4 to the floor 3. These securing means preferably permit securing without passing through the foam plate 2.

In one embodiment, the degree of compression of the foam plate 2 is between 20% and 60%. Preferably, the degree of compression of the foam plate 2 is approximately 30%. The expression "degree of compression" is to be understood as the ratio of the difference between the thickness of the foam plate 2 at rest and the thickness of the foam plate 2 when compressed, divided by the thickness of the foam plate 2 at rest.

The foam plate 2 may have a thickness of between 10 mm and 20 mm when it is compressed between the floor 3 and the battery tray 4. Preferably, the foam plate 2 has a thickness of approximately 20 mm at rest. Once the structure is installed, said foam plate 2 is compressed by approximately 30%. Thus, the thickness of the foam plate 2 once compressed and installed between the floor 3 and the battery tray 4 is approximately 13 mm.

The foam plate 2 also comprises means for evacuating the air contained in the solid matrix. These air evacuation means make it possible to evacuate the air from the foam plate 2 when it is compressed. This evacuation of air makes it possible to reduce the risk of the plate 2 bursting on compression due to the increased air pressure.

In a first embodiment, shown in FIG. 3A, at least one surface of the foam plate 2 comprises micro-perforations. The surface comprising the micro-perforations is preferably an upper surface of the foam plate 2. Thus, the evacuation of the air is not hampered by the surface of the floor 3 or of the battery tray 4.

The micro-perforations extend over a portion of the volume of the foam plate 2. Thus, the air trapped in the network of the solid matrix can more easily leave said matrix by passing through these perforations.

The micro-perforations may have a thickness or a diameter of between 0.05 mm and 3 mm. The micro-perforations may extend in the volume of the foam plate 2 over a length of between 20% and 99% of the length or of the width of the foam plate 2.

In one embodiment, at least one micro-perforations passing through the foam plate 2 from side to side over its length or over its width.

The foam plate 2 may comprise a micro-perforation density of between 2 and 10 micro-perforations per $mm^2$, preferably between 2 and 6 micro-perforations per $mm^2$.

These characteristics of the micro-perforations advantageously permit better evacuation of the air contained in the foam during compression of the plate, and serves to prevent ingress of water into the foam.

The micro-perforation can be positioned on both faces of the plate 2, preferably only one of the two faces is micro-perforated, this face must be positioned on the upper surface of the plate 2, that is to say toward the passenger compartment of the vehicle (in contact with the floor of the motor vehicle structure).

In a second embodiment, shown in FIG. 3B, the foam plate 2 comprises at least one hole 7 which opens on at least one main face, in particular a hole 7 passing through the thickness of the plate. The open hole 7 serves to shorten the minimum distance that the air must travel in order to leave the foam plate 2.

If the foam plate 2 comprises a single open hole 7, said open hole 7 is preferably located in a central region of the foam plate 2.

In one embodiment, the area of the orifice of the open hole 7 is less than 5% or less than 1% of the area of the foam plate 2 that is intended to come into contact against the battery tray 4 or of the area of the foam plate 2 that is intended to come into contact against the floor 3.

In the embodiment in which the foam plate 2 comprises multiple open holes 7, the sum of the areas of the orifices of the open holes 7 is less than 20% or less than 10% of the area of the foam plate 2 that is intended to come into contact against the battery tray 4 or of the area of the foam plate 2 that is intended to come into contact against the floor 3.

The above-described second embodiment may also be combined with the first embodiment.

In a third embodiment, shown in FIG. 3C, which is compatible with the first and/or the second embodiment, the foam plate 2 comprises a portion located toward the rear of the vehicle, of which the surface comprises holes 8 for evacuating the air.

Indeed, positioning larger-diameter holes 8 in the rear region makes it possible to evacuate a larger volume of air. This solution is particularly effective in the case where the micro-perforations do not make it possible to evacuate a sufficiently large volume of air in a relatively short time. The rear region, counter to the direction of travel of the vehicle, is subject to less stringent demands in terms of durability.

Thus, the risk of overpressure of air at the heart of the matrix is limited.

Thus, the assembly comprising the battery tray 4 and the foam plate 2 beneath the floor 3 creates a mass-spring-mass effect. The vibrations in the wall of the battery tray 4 and the sound waves are damped in the spring (the foam plate 2). Finally, the sound and the vibrations are damped.

In one embodiment, the battery tray 4 comprises at least one securing region 6. The at least one securing region 6 may extend laterally relative to the upper side 41.

The upper side 41 may be arranged so as to leave a space (between the battery tray 4 and the floor 3) for the insertion of the foam plate 2 as described hereinabove.

The at least one securing region 6 may comprise securing means such as bores or tapped holes for securing the battery tray 4 to the floor 3.

The invention also relates to a vehicle comprising such a structure 1. The vehicle is preferably a motor vehicle, most preferably a motor vehicle comprising an electric motor for driving the vehicle.

The invention also relates to a method for assembling a vehicle structure 1. One embodiment of an assembly method is described below. The vehicle structure 1 is preferably a vehicle structure 1 as previously described.

The method comprises the following steps:
arranging a foam plate 2 between a vehicle floor 3 and a battery tray 4;
compressing said foam plate 2 to a degree of compression of between 20% and 40%;
securing the battery tray 4 to the floor 3 in such a way that the battery tray 4 and the floor 3 are separated by a distance which is smaller than the thickness of the foam plate 2 at rest.

Preferably, said distance is between 60% and 80% of the thickness of the foam plate 2 at rest.

In one embodiment, the compressing and securing steps are carried out at the same time.

In the present application, the expression "approximately", when followed by a numerical value, is to be understood as a range of 10% either side of said numerical value.

The invention claimed is:

1. A stricture for an electric or hybrid vehicle, comprising:
a floor;
a battery tray secured beneath the floor; and
a compressed foam plate arranged between the battery tray and the floor,
wherein a surface of the foam plate comprises microscopic perforations configured for evacuating air contained in the foam when the foam plate is compressed and/or configured to avoid ingress of water into the foam, and
wherein a density of the microscopic perforations is between 2 and 10 of the microscopic perforations per mm$^2$ of the surface of the foam plate.

2. The vehicle structure as claimed in claim 1, wherein the foam plate further comprises a hole that opens on only one of its faces, the hole being configured for evacuating air contained in the foam when the foam plate is compressed.

3. The vehicle structure as claimed in claim 1, wherein the foam plate further comprises a portion positioned toward the rear of the vehicle, of which the surface comprises holes configured for evacuating air contained in the foam when the foam plate is compressed.

4. The vehicle structure as claimed in claim 1, wherein the foam plate is compressed between the floor and the battery tray with a degree of compression of between 20% and 40% inclusive.

5. The vehicle structure as claimed in claim 4, wherein the degree of compression of the foam plate is between 30% and 40% inclusive.

6. The vehicle structure as claimed in claim 1, wherein a thickness of the foam plate when compressed is between 10 mm and 20 mm inclusive, with a degree of compression of 30% of the foam plate.

7. The vehicle structure as claimed in claim 1, wherein a thickness of the foam plate when compressed is between 13 mm and 14 mm inclusive, with a degree of compression of 30% of the foam plate.

8. The vehicle structure as claimed in claim 1, wherein a thickness of the foam plate when compressed is 13 mm, with a degree of compression of 30% of the foam plate.

9. The vehicle structure as claimed in claim 1, wherein the foam plate comprises a polyurethane foam.

10. The vehicle structure as claimed in claim 1, wherein the foam is a foam having cells of dimensions smaller than 2 mm.

11. The vehicle structure as claimed in claim 1, wherein the surface of the foam plate that comprises microscopic perforations is a top face of the foam plate, and a bottom face of the foam plate does not include any of the microscopic perforations.

12. The vehicle structure as claimed in claim 1, wherein at least one of the microscopic perforations passes completely through a length of the foam plate.

13. The vehicle structure as claimed in claim 1, wherein at least one of the microscopic perforations passes completely through a width of the foam plate.

14. A vehicle, comprising:
a floor;
a battery tray secured beneath the floor; and
a compressed foam plate arranged between the battery tray and the floor,
wherein a surface of the foam plate comprises microscopic perforations configured for evacuating air contained in the foam when the foam plate is compressed and/or configured to avoid ingress of water into the foam, and
wherein a density of the microscopic perforations is between 2 and 10 of the microscopic perforations per mm$^2$ of the surface of the foam plate.

15. The vehicle as claimed in claim 14, wherein the vehicle is a hybrid vehicle or an electric motor vehicle.

16. A method for assembling a vehicle structure comprising:
perforating a foam plate;
arranging the foam plate between a vehicle floor and a vehicle battery tray;
compressing the foam plate to a degree of compression of between 20% and 40%; and
securing the battery tray to the floor in such a way that the foam plate remains compressed to a degree of compression of between 20% and 40%,
wherein a surface of the foam plate comprises microscopic perforations configured for evacuating air contained in the foam when the foam plate is compressed and/or configured to avoid ingress of water into the foam, and
wherein a density of the microscopic perforations is between 2 and 10 of the microscopic perforations per mm$^2$ of the surface of the foam plate.

* * * * *